UNITED STATES PATENT OFFICE.

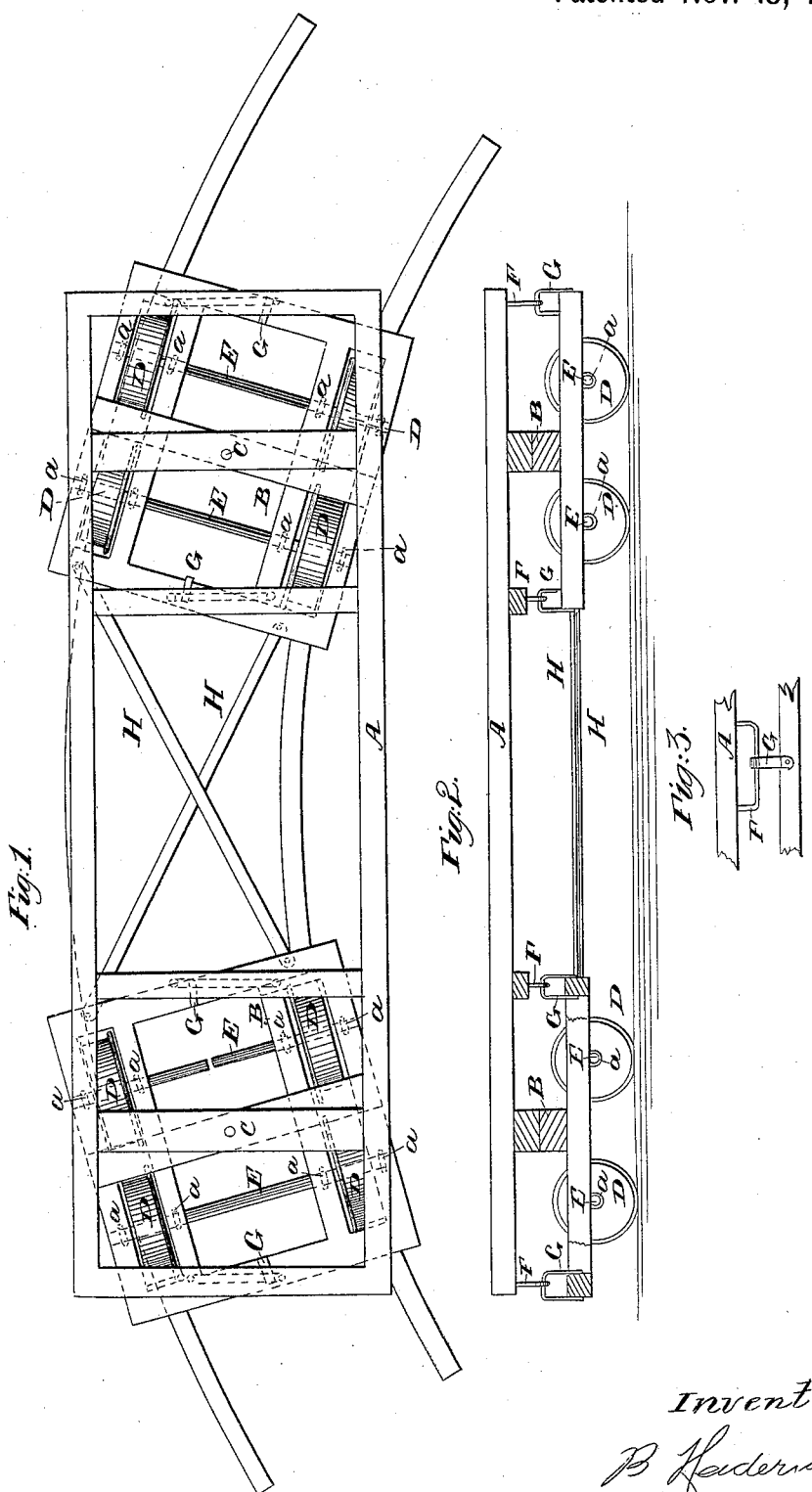

B. HEIDERICH, OF BRADY'S BEND, PENNSYLVANIA.

IMPROVEMENT IN CAR-TRUCKS.

Specification forming part of Letters Patent No. 59,601, dated November 13, 1866.

*To all whom it may concern:*

Be it known that I, B. HEIDERICH, of Brady's Bend, in the county of Armstrong and State of Pennsylvania, have invented a new and useful Improvement in the Running-Gear of Railroad-Cars; and I do hereby declare that the following is a full, clear, and exact description thereof, which will enable those skilled in the art to make and use the same, reference being had to the accompanying drawings, forming part of this specification, in which—

Figure 1 is a plan or top view of the trucks of a car constructed according to my invention; Fig. 2, a side sectional view of the same, taken in the line *x x*, Fig. 1; Fig. 3, a detached view of a portion of the same.

Similar letters of reference indicate corresponding parts.

This invention consists in a novel manner of arranging the bearings of the axles, whereby due provision is made against accidents caused by the breaking of the axles—a contingency of frequent occurrence.

The invention also consists in a means for supporting the trucks whereby the latter will be retained in running position if a wheel should break; and the invention further consists in a mode of connecting the two trucks together, whereby the same will be made to turn or adjust themselves in a radial position in turning curves on the road, and the trucks prevented from running off the rails if a flange of a wheel should break, one truck serving as a guide for the other.

A represents the bed or bottom of a car-body, and B B two trucks attached thereto by the usual central bolts, C C. These trucks are each provided with four wheels, D, the axles E E of each truck being fitted in four bearings or boxes, *a*, as shown in Fig. 1, a bearing or box being at each side of each wheel. By this arrangement it will be seen that each wheel is supported in such a manner that if an axle breaks in the center its wheels will be held in position, and the same will be the case if an axle should break at the outer side of a wheel. Hence the accidents arising from the breaking of axles will be avoided.

To the under side of the bed or bottom A of the car there are secured four pendent oblong loops, F, one over the front and rear of each truck, and to the front and rear of each truck there are attached loops G, which are fitted in or pass through the loops F. These loops serve as supports for the trucks in case of the breaking of a wheel, enabling the trucks to run on those wheels, and preventing accidents in case of such a contingency, the loops F being sufficiently long to admit of a requisite turning movement of the trucks.

The two trucks B B are connected by diagonal bars H H, which cross each other, as shown clearly in Fig. 1. These bars H cause the two trucks B B to move or turn simultaneously on their pivots when a car is passing over a curve, and one truck serves as a guide for the other, so that in case of the breaking of a flange of a wheel the car will be prevented from running off from the rails, while the bars H H do not interfere in the least with the free movement of the trucks.

This improvement in the running-gear of car-trucks will prevent many accidents which now very frequently occur from the breaking of axles, wheels, and flanges.

Having thus described my invention, I claim as new and desire to secure by Letters Patent—

The supporting of the trucks from the bed or bottom of the car by means of the loops F G, substantially as and for the purpose set forth.

B. HEIDERICH.

Witnesses:
HUGH MOORE,
GEO. H. MOORE.